Patented July 4, 1950

2,514,216

UNITED STATES PATENT OFFICE 2,514,216

STABILIZATION OF DICHLOROBUTADIENE RESINS

Eugene P. Stefl, Cuyahoga Falls, and Lloyd O. Bentz, Akron, Ohio, assignors to The Firestone Tire & Rubber Company, Akron, Ohio, a corporation of Ohio No Drawing. Application April 8, 1949, Serial No. 86,406

8 Claims. (Cl. 260—45.85)

This invention relates to the stabilization, against discoloration and other deterioration by light and oxidation, of resinous polymers and copolymers of 2,3-dichloro-1,3-butadiene, hereinafter referred to, for brevity, as "dichlorobutadiene." In general, the invention is based upon the discoverey that the resistance to light of these polymers and copolymers may be greatly enhanced by the addition thereto of 4-alkylphenyl salicylates in which the alkyl group contains from 9 to 12 carbon atoms.

THE DICHLOROBUTADIENE RESINS

Referring first to the dichlorobutadiene polymers which may be stabilized in accordance with this invention, this compound has been polymerized heretofore to yield products aptly described as hard, infusible and insoluble. While such refractory resins may be stabilized in accordance with this invention, it has been discovered by an associate of the present applicants that the intractable nature of the earlier dichlorobutadiene polymers is due to their excessive molecular weights and to a slight cross-linking which becomes significant at such high molecular weights. It has further been discovered by said associate that, providing the polymers of dichlorobutadiene are prepared in such a manner that their molecular weight corresponds to an intrinsic viscosity of from 0.1 to 1.5, the polymers are fusible to yield fluid melts, are soluble in hot solvents and have crystalline properties similar to those of the nylon and vinylidene chloride resins—i. e., they may be extruded and cold-stretched to yield filaments, cordage etc., having excellent strength and flexibility and exhibiting oriented-crystalline X-ray patterns. These latter resins are clearly of great technical merit, and accordingly the invention is more particularly directed to the stabilization of such crystalline resins. However, it is to be understood that any polymers or copolymers of dichlorobutadiene (whether or not crystalline as above described) containing a sufficient amount of dichlorobutadiene (say from about 25% to 100% based on the total weight of resin) so that failure thereof under exposure to light occurs by mechanisms involving the polydichlorobutadiene structure, may be stabilized in accordance with this invention.

Some techniques which have been found to yield polymers of dichlorobutadiene having an intrinsic viscosity range of from 0.1 to 1.5 are:

1. A restrained chlorination of any infusible polymer or copolymer of dichlorobutadiene prepared in accordance with the prior art, the chlorine uptake being strictly confined to the range 2—10%, and preferably 3–5%, based on the weight of polymer. This degree of chlorination does not appear to alter the essential polymeric chain, but merely breaks up excessively long molecules, and the cross-linkages and side-structure attendant thereon.

2. The use of "modifying agents," as the term is used in the synthetic rubber industry, to include certain polymerization-controlling substances such as lauryl mercaptan, butyl mercaptan, thiophenols, hexamethylene dimercaptan, diisopropyl xanthogen disulfide. The inclusion, in the polymerization mass, of from 0.5 to 3.0%, or in the case of some of the less powerful modifiers, as high as 15% of these modifiers, based on the weight of monomers (including comonomers as detailed below) will develop highly crystalline properties in the resultant resins. This technique is applicable to solution, emulsion or mass polymerization. Recommended amounts of the various types of modifiers are as follows.

Table I

| Type of Modifier | Amount to be used [1] |
|---|---|
| Aryl mercaptans (containing —SH groups directly attached to aromatic nuclei) | 0.05 to 2.0 |
| Aliphatic, cycloaliphatic, and araliphatic mercaptans (containing from 1 to 8 carbon atoms) | .5 to 5.0 |
| Aliphatic, cycloaliphatic and araliphatic mercaptans (containing from 9 to 20 carbon atoms) | 2 to 15 |

[1] Percent, based on weight of dichlorobutadiene in polymerization mass.

3. Polymerization in non-reacting organic solvents, e. g. toluene, benzene, methanol, ethanol, ether, hexane, etc., in concentrations from about 10% to about 60%, based on the total weight of solvent and dichlorobutadiene, at relatively elevated temperatures on the order of from about 40° to about 100° C., and in the presence of from about 0.1% to 5.0%, based on the total weight of polymerization mass, of a peroxidic catalyst such as benzoyl peroxide.

4. Polymerizing dichlorobutadiene or mixtures thereof with copolymerizable compounds in solution in organic solvents at temperatures in excess of 120° C., in the presence of inhibitors such as p-cresol employed to the extent of about 1%, based on the weight of dichlorobutadiene.

Of all of these techniques, that outlined under (2) is the most practical and reliable for the manufacture of resins for extrusion and orientation into filaments, to the stabilization of which the present invention is of especial application.

As noted above, the present invention may be applied to the stabilization of both of homopolymers of dichlorobutadiene and of copolymers thereof with unsaturated compounds copolymerizable therewith. Dichlorobutadiene is readily copolymerizable with a wide variety of unsaturated compounds which are themselves addition-polymerizable; and the stability of the resultant resins is materially enhanced by the addition of higher 4-alkylphenyl salicylates in accordance with this invention, provided that the dichlorobutadiene is present to an extent (say 25% to 100%, based on the weight of resin) such that the mechanism of degradation thereof contributes substantially to the ultimate failure of the resin. It is understood that, if the resin is to be of the fusible, crystalline type, it must not contain more than about 2% of a cross-linking comonomer (i. e., a plurally unsaturated comonomer in which the ethylenic groups are not conjugated or cross-conjugated) nor more than about 10–15% of any other comonomer. These last two restrictions do not apply, if fusible, crystalline resins are not desired. Suitable non-crosslinking comonomers are exemplified in vinyl compounds on the order of vinyl chloride, vinyl acetate, vinyl ethyl ether, vinyl β-chloroethyl ether, etc.; vinyl ketones such as vinyl methyl ketone, methyl isopropenyl ketone, vinyl phenyl ketone, etc., cyclic vinyl compounds such as styrene, α-methyl styrene, nuclearly chlorinated styrenes, p-vinyl benzoic acid, β-vinyl naphthalene, vinyl benzoate, vinyl carbazole, various vinyl pyridines, and the like; acrylic and substituted acrylic compounds such as methyl acrylate, methyl methacrylate, vinyl furane, ethyl chloroacrylate, methacrylonitrile, chloroacrylonitrile, acrylonitrile and the like; vinylidene halides such as vinylidene chloride, vinylidene bromide, 1-fluoro-1-chloroethylene; 1,1-dichloro-2,2-difluoro-ethylene; compounds bearing an active cyclic unsaturated carbon atom such as coumarone, indene, 4-methylene-1,3-dioxolane, substituted derivatives of this material, and the like. Examples of suitable conjugated and cross-conjugated copolymerizable compounds are butadiene, cyclopentadiene, chloroprene, 1-chlorobutadiene, isoprene, 2,3-dimethyl butadiene-1,3, piperylene, 2-methyl pentadiene, etc.

THE 4-ALKYLPHENYL SALICYLATES

The 4-alkylphenyl salicylates employed as stabilizers in accordance with this invention may be any compounds having the formula

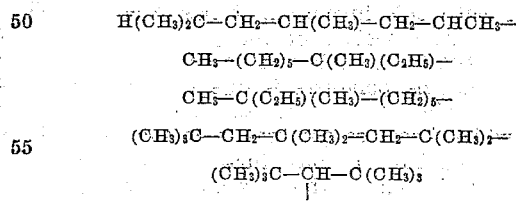

(Alkyl group containing 9 to 12 carbons)

in which formula the substituent indicated by the brackets is, as indicated, any alkyl group of any configuration containing from 9 to 12 carbon atoms. The 4-alkylphenyl salicylates in which the alkyl group at the 4-positions in the phenyl groups contain from 1 to 8 carbon atoms provide only mediocre stabilizing action in dichlorobutadiene resins. However, beginning at compounds containing 9 carbon atoms in the alkyl group, the stabilizing action abruptly becomes of a very high order. This high degree of stabilization is also characteristic of the compounds containing 10 and 11 carbon atoms in the alkyl groups. The peak appears to have been passed at the compounds containing 12-carbon atoms in the alkyl groups, as these compounds are definitely, though slightly, inferior to those in which the alkyl groups contain from 9 to 11 carbon atoms. Nevertheless, the compounds containing 12 carbon atoms in the alkyl groups are distinctly superior to compounds containing from 1 to 8 carbon atoms, or more than 12 carbon atoms, and hence are to be included in the scope of this invention. The degree of stabilizing effectiveness of any of the 4-alkylphenyl salicylates appears to be almost exclusively a function of the number of carbon atoms in the alkyl group, and to be largely independent of the configuration of that alkyl group: parallel tests with various isomeric 4-alkylphenyl salicylates all containing the same number of carbon atoms in the alkyl groups give closely similar results. Thus, the 9- to 12-carbon atom alkyl group indicated by the brackets in the formula may be a normal alkyl group such as n-nonyl, n-decyl, n-undecyl or n-dodecyl; a straight-chain secondary alkyl such as sec-nonyl, sec-decyl etc.; and various branched-chain alkyl groups such as

H(CH₃)₂C—CH₂—CH(CH₃)—CH₂—CHCH₃—

CH₃—(CH₂)₃—C(CH₃)(C₂H₅)—

CH₃—C(C₂H₅)(CH₃)—(CH₂)₅—

(CH₃)₃C—CH₂—C(CH₃)₂—CH₂—C(CH₃)₂—

(CH₃)₃C—CH—C(CH₃)₃
                | and the like. It is to be understood, of course, that there may be employed mixtures of various 4-alkylphenyl salicylates coming under the formula as above described. For instance there may be employed salicylates of phenol which has been alkylated in the 4-position with unsaturated petroleum fractions comprising monoölefins containing from 9 to 12 carbon atoms; likewise there may be employed salicylates of phenols 4-alkylated with monoölefin dimers, trimers and tetramers; for instance the mixed nonenes obtained by trimerization of propene, the mixed dodecenes obtained by trimerization of butene, the mixed dodecenes obtained by tetramerization of propene, or the mixed dodecenes obtained by trimerization of isobutene, etc.

Coming now to the amount of the 4-alkylphenyl salicylate to be added to the dichlorobutadiene resin, as little as 0.5% of these materials, based on the weight of the resin, will definitely enhance the resistance of the resin to disclororation and other deterioration by light. Increasing quantities, up to about 8%, will give still further enhanced stability. For most practical purposes, from 2 to 7% will provide an adequate degree of protection. Still greater quantities up to 20% may be employed, but will usually be found unnecessary and wasteful. All of the foregoing percentages are given on the basis of the weight of the resin.

With the foregoing general discussion in mind, there are given herewith detailed examples of the practice of this invention. All parts given are by weight.

EXAMPLE

A. *Preparation of 4-alkylphenyl salicylates*

| | |
|---|---|
| Selected 4-alkylphenol (per Table II)_____gram-moles__ | 0.5 |
| Salicylic acid _____do____ | 0.5 |
| Phosphorus oxychloride_____do____ | 0.16 |
| Benzene _____ml__ | 200 |

A series of 4-alkylphenyl salicylates were prepared, in which the alkyl groups contained various numbers of carbon atoms from one to twelve. In each case the appropriate 4-alkylphenol, salicylic acid, phosphorus oxychloride and benzene in the proportions indicated in the above recipe, were refluxed together for approximately 20 hours. At the end of this time, the liquid portion of the reaction mass was decanted from the dark sludge on the bottom of the reaction vessel, and filtered to remove any suspended matter. The filtered benzene solution was washed successively with portions of distilled water, 5% sodium hydroxide aqueous solution, and finally again with distilled water. The benzene was then removed by distillation, and the reaction mass fractionally distilled under reduced pressure. Particulars of the several runs are set forth in Table II below.

B. *Preparation of 2,3-dichloro-1,3-butadiene polymers*

| | Parts |
|---|---|
| Distilled water_____ | 330 |
| 2,3-dichloro-1,3-butadiene _____ | 100 |
| Alkyl sodium sulfonates [1]_____ | 1.0 |
| Potassium persulfate_____ | .02 |
| Thiophenol _____ | 0.15 |

[1] "MP-189-EF," manufactured by E. I. du Pont de Nemours & Co. Sodium salts of the products of sulfonation of 10 to 16 carbon-atom paraffins under exposure to ultraviolet light. Free of electrolytes.

The above ingredients were charged under anerobic conditions into a polymerization vessel and agitated at 30°–40° C. for 24 hours. The resultant latex was coagulated by addition of methanol, the coagulum dewatered by filtration, washed with water on the filter, and dried. The resultant pulverulent resin was employed as a base resin for stabilization tests as described hereinafter. This resin had an intrinsic viscosity, measured in ortho dichlorobenzene at 110° C., of 0.43.

C. *Preparation of stabilization test specimens*

| | Parts |
|---|---|
| Dichlorobutadiene polymer (prepared as described under "B" above)_____ | 100 |
| 4-alkyl salicylate (per Table II)____ | 2, 3, 4 or 6 |
| Acetone _____ | 15 |

A series of stabilization tests was run, using various 4-alkylphenyl salicylates (both within and without the scope of this invention) in the various proportions indicated in the above recipe and set forth in Table II hereinafter. In each test, the selected 4-alkylphenyl salicylate, in the selected amount, and the acetone were dissolved together, the dichlorobutadiene polymer was added to the solution and the entire mixture was thoroughly worked together. The mixture was then spread out into a thin layer and freed of the acetone by application of gentle heat.

One-half gram of the blended resin and plasticizer was poured onto a sheet of aluminum foil to form a conical pile, a second sheet of aluminum foil placed on the pile to cover the same, and the assembly placed in a laboratory press having flat parallel platens heated to 180° C. The platens were quickly closed on the assembly, and left in light contact therewith for 10 seconds, after which a total load of 2460 pounds was applied to the platens and maintained for 30 seconds. The press was then quickly opened, the assembly removed and quenched in cold water and the foil sheets peeled off from the resultant fused plaque (usually about .005 inch thick) of resin and stabilizer. From this plaque were cut test specimens 2 inches long and .25 inch wide, which were subjected for varying periods of time to a light aging test as described below.

*Exposure of test specimens*

The test specimens prepared as above described were then subjected to exposure for various periods of time in a test substantially identical with the A. S. T. M. test D620–45T. For this test there is provided a General Electric sunlamp, Model BM12 equipped with a reflector approximately 15 inches in diameter at the lower rim, with a General Electric S–1 bulb which has been in operation at least 50 hours and less than 550 hours. The S–1 bulb consists of a combination tungsten filament and mercury arc enclosed in a Corex D glass envelope which absorbs most of the ultraviolet radiation below 2800 Å. The bulb is rated at 400 watts and operating voltage is maintained at 100±2 volts.

There is provided a circular plane turntable 17 inches in diameter revolving at 15 R. P. M. upon an axis through its center and perpendicular to its plane. The lamp is mounted coaxially with said axis, with the bottom of the bulb 7 inches from the center of the turntable. The test specimens are mounted flat on a white circular cardboard $\frac{1}{16}$ inch thick and 15 inches in diameter placed on the turntable concentric therewith. The specimens (a large number are run simultaneously) are disposed radially upon the cardboard, with their inner ends on a radius 3¾ inches from the center thereof. A circular cover card 4¾ inches in diameter is mounted on top of the specimens concentric with the turntable so as to cover the innermost half of the specimens.

At the end of the periods of exposure of the test specimens, they were removed and subjectively rated as to color by comparison with a series of standard colored specimens ranging from water-white to dark brown and arbitrarily rated from 0 for water-white to 10 for dark brown. Following are the results of these tests.

Table II

| Phenyl Salicylate Used | | | Amount Used in Stabilization Test, parts by wt. | Color Rating of test Plaque at the End of— | | | | | | | | | | | | Item No. |
| --- | --- | --- | --- | --- | --- | --- | --- | --- | --- | --- | --- | --- | --- | --- | --- | --- |
| Phenol Employed In Synthesis (alkyl group substituted in 4-position) | Fractionation of Product | | | 20 hrs. | 24 hrs. | 40 hrs. | 48 hrs. | 60 hrs. | 72 hrs. | 80 hrs. | 90 hrs. | 96 hrs. | 120 hrs. | 144 hrs. | 185 hrs. | |
| | Temp. range of Cut, °C. | Pressure in distillation apparatus (mm. of Hg) | | | | | | | | | | | | | | |
| Unsubstituted phenol | | | 3 | 4 | | 6 | | 6 | | 7 | | | | | | 1 |
| Methyl | | | 3 | 1 | | 4 | | 4 | | 6 | | | | | | 2 |
| Ethyl | 132 | 0.08 | 3 | 2 | | 6 | | | | | | | | | | 3 |
| Isopropyl | | | 3 | | 0+ | | 1 | | 6 | | 10 | | | | | 4 |
| t-Butyl | | | 3 | 3 | | 6 | | | | | | | | | | 5 |
| sec-Amyl | 123-4 | 0.10 | 3 | | 0+ | | 2 | | 5 | | 8 | | | | | 6 |
| t-Amyl | | | 3 | | 0+ | | 2 | | 5 | | 8 | | | | | 7 |
| hexyl [1] | 170-7 | 0.3 | 3 | 3 | | 5 | | | | | | | | | | 8 |
| tt-octyl | | | 3 | 4 | | 6 | | | | | | | | | | 9 |
| mixed 4-nonyl phenols,[2] | | | | | | | | | | | | | | | | |
| General product | 145-200 | 0.20 | 3 | | 0 | | 0 | | 0+ | | | 0+ | | | 3 | 10 |
| Fraction I | 146-157 | 0.10 | 3 | | 0 | | 0 | | 0+ | | | 1 | 1 | 2 | 3 | 11 |
| Fraction II | 157-161 | 0.10 | 3 | | 0 | | 0 | | 0+ | | | 1 | 1 | 2 | 3 | 12 |
| Fraction III | 162 | 0.10 | 3 | | 0 | | 0 | | 0+ | | | 1 | 1 | 2 | 3 | 13 |
| Fraction IV | 162-166 | 0.10 | 3 | | 0 | | 0 | | 0+ | | | 1 | 1 | 2 | 3 | 14 |
| Fraction IV | 166 | 0.10 | 3 | | 0 | | 0 | | 0+ | | | 1 | 1 | 2 | 3 | 15 |
| Fraction V [3] | 100 | .002 | 3 | | 0 | | 0 | | 0+ | | | 1 | 1 | 2 | 3 | 16 |
| Fraction VI [3] | 110 | .002 | 3 | | 0 | | 0 | | 0+ | | | 1 | 1 | 2 | 3 | 17 |
| Fraction VII [3] | 120 | .001 | 3 | | 0 | | 0 | | 0+ | | | 1 | 1 | 2 | 3 | 18 |
| Fraction VIII [3] | 140 | .001 | 3 | | 0 | | 0 | | 0+ | | | 1 | 1 | 2 | 3 | 19 |
| Fraction IX [3] | 150 | .001 | 3 | | 0 | | 0 | | 0+ | | | 1 | 1 | 2 | 3 | 20 |
| Fractions V-IX | | | 2 | | 0 | | 1 | | 2 | | | 3 | 4 | 5 | 8 | 21 |
| | | | 3 | | 0 | | 0 | | 0+ | | | 1 | 1 | 2 | 3 | 22 |
| | | | 4 | | 0 | | 0 | | 0 | | | 0 | 0+ | 0+ | 1 | 23 |
| | | | 6 | | 0 | | 0 | | 0 | | | 0 | 0 | 0 | 0+ | 24 |
| Mixed 4-decylphenols:[4] | | | | | | | | | | | | | | | | |
| Fraction A | 130-152 | 0.10 | 3 | | 0 | | 0 | | 0+ | | | 1 | 1 | 2 | 3 | 25 |
| Fraction B | 152-160 | 0.10 | 3 | | 0 | | 0 | | 0+ | | | 1 | 1 | 2 | 3 | 26 |
| Fraction C | 160-164 | 0.10 | 3 | | 0 | | 0 | | 0+ | | | 1 | 1 | 2 | 3 | 27 |
| Fraction D | 164-166 | 0.10 | 3 | | 0 | | 0 | | 0+ | | | 1 | 1 | 2 | 3 | 28 |
| Mixed dodecyl phenols [5] | 98-100 | 0.09 | 3 | | 0+ | | 2 | | 4 | | 5 | | | | | 29 |
| | | | 5 | | 0+ | | 2 | | 4 | | 5 | | | | | 30 |

[1] Containing mixed hexyl groups derived from a mixture of 6-carbon olefines. Offered by Sharples Chemicals Inc. as "p-tert-hexyl phenol." Boiling range of the alkylated phenol 155-165° C. at 20 mm.
[2] Containing mixed nonyl groups derived from mixed nonenes produced by trimerization of propene. Contains substantially all possible isomers, no isomer being present to the extent of more than 15%. Boiling range of phenols 295-304° C., specific gravity 20°/20° 0.968, $n_F^{20}$ 1.517. Offered by Sharples Chemicals Inc. as "nonyl phenol."
[3] These fractions were obtained in a short-path or so-called "molecular" still.
[4] Containing mixed decyl groups derived from a mixture of 10-carbon olefins. Offered by Sharples Chemicals Inc. as "decyl phenol."
[5] Containing mixed dodecyl groups derived from mixed dodecenes produced by tetramerization of propene. Offered by Sharples Chemicals Inc. as "dodecyl phenol," boiling range 310-335° C., specific gravity 20° C./20° C. 0.93, $n_F^{20}$ 1.517.

From the table, it will be evident that the lower 4-alkylphenyl salicylates containing from one to eight carbon atoms in the alkyl group (Items Nos. 1–9) have at most only mediocre stabilizing ability. However, beginning with the alkyl salicylates containing nine carbon atoms to which the present invention relates, an abrupt and remarkable improvement in the stabilizing effectiveness will be noted (Items Nos. 10–24). The 4-decyl phenyl salicylates (Items Nos. 25–28) provide the same high degree of stabilizing action. The 4-dodecyl phenyl salicylate (Items Nos. 29 and 30) provides a somewhat less effective stabilizing action, although the protection afforded is still good. The stabilizing action appears to be a function primarily of the number of carbon atoms in the alkyl group on the 4-position, and not to depend greatly on the configuration of the alkyl group itself, note that the different isomers (Items Nos. 10–22 and Items Nos. 25–28) of a given compound all exert approximately the same stabilizing action.

From the foregoing general discussion and detailed specific examples, it will be evident that this invention provides novel and highly effective agents for stabilizing the dichlorobutadiene resins. The stabilizers of this invention may readily be synthesized from cheaply and readily procurable starting materials, and entail no special difficulties in compounding and use. The stabilizers are non-toxic and, so far as has been observed, have no irritating effect on the skin.

What is claimed is:

1. A light-stable composition of matter comprising (A) a resin selected from the group consisting of polymers of 2,3-dichloro-1,3-butadiene and copolymers thereof with other unsaturated compounds copolymerizable therewith containing at least 25% of 2,3-dichloro-1,3-butadiene copolymerized therein, together with (B) from 0.5% to 20%, based on the weight of said resin, of a 4-alkylphenyl salicylate in which the alkyl group contains from 9 to 12 carbon atoms.

2. A light-stable composition of matter comprising (A) a resin selected from the group consisting of polymers of 2,3-dichloro-1,3-butadiene and copolymers thereof with other unsaturated compounds copolymerizable therewith containing at least 25% of 2,3-dichloro-1,3-butadiene copolymerized therein, together with (B) from 0.5% to 20%, based on the weight of said resin, of a 4-nonylphenyl salicylate.

3. A light-stable composition of matter comprising (A) a resin selected from the group consisting of polymers of 2,3-dichloro-1,3-butadiene and copolymers thereof with other unsaturated compounds copolymerizable therewith containing at least 25% of 2,3-dichloro-1,3-butadiene copolymerized therein, together with (B) from 0.5% to 20%, based on the weight of said resin, of a mixture of 4-nonylphenyl salicylates in which the nonyl groups are derived from the mixed nonenes produced by trimerization of propene.

4. A light-stable composition of matter comprising (A) a resin selected from the group consisting of polymers of 2,3-dichloro-1,3-butadiene and copolymers thereof with other unsaturated compounds copolymerizable therewith containing at least 25% of 2,3-dichloro-1,3-butadiene copolymerized therein, together with (B) from 0.5% to 20%, based on the weight of said resin, of a 4-decylphenyl salicylate.

5. A light-stable composition of matter comprising a polymer of 2,3-dichloro-1,3-butadiene having an intrinsic viscosity from 0.1 to 1.5, together with from 0.5% to 20%, based on the weight of said polymer, of a 4-alkylphenyl salicylate in which the alkyl group contains from 9 to 12 carbon atoms.

6. A light-stable composition of matter comprising a polymer of 2,3-dichloro-1,3-butadiene having an intrinsic viscosity of from 0.1 to 1.5, together with from 0.5% to 20%, based on the weight of said polymer, of a 4-nonyl phenyl salicylate.

7. A light-stable composition of matter comprising a polymer of 2,3-dichloro-1,3-butadiene having an intrinsic viscosity of from 0.1 to 1.5, together with from 0.5% to 20%, based on the weight of the polymer, of a mixture of 4-nonyl phenyl salicylates in which the nonyl groups are derived from the mixed nonenes produced by trimerization of propene.

8. A light-stable composition of matter comprising a polymer of 2,3-dichloro-1,3-butadiene having an intrinsic viscosity of from 0.1 to 1.5, together with from 0.5% to 20%, based on the weight of said polymer, of a 4-decyl phenyl salicylate.

EUGENE P. STEFL.
LLOYD O. BENTZ.

REFERENCES CITED

The following references are of record in the file of this patent:

UNITED STATES PATENTS

| Number | Name | Date |
|---|---|---|
| 2,445,739 | Rowland et al. | July 20, 1948 |

Certificate of Correction

July 4, 1950

Patent No. 2,514,216 — EUGENE P. STEFL ET AL.

It is hereby certified that error appears in the printed specification of the above numbered patent requiring correction as follows:

Column 4, lines 4 to 8 inclusive, for

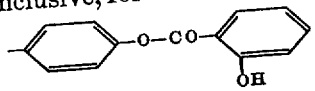

(Alkyl group containing 9 to 12 carbons)

read

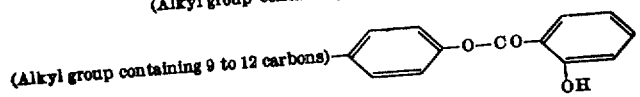

columns 7 and 8, in the second and fifth footnotes under Table II, for "$n_p^{20}$ 1.517" read $n_D^{20}$ 1.517; and that the said Letters Patent should be read as corrected above, so that the same may conform to the record of the case in the Patent Office.

Signed and sealed this 26th day of June, A. D. 1951.

[SEAL]

THOMAS F. MURPHY,
*Assistant Commissioner of Patents.*